US007965630B1

(12) United States Patent
Floyd et al.

(10) Patent No.: US 7,965,630 B1
(45) Date of Patent: Jun. 21, 2011

(54) LOAD BALANCING PORT PROXY FOR DYNAMICALLY CONTROLLING ROUTING OF QUERY REQUESTS

(75) Inventors: Gregory R. Floyd, McDonough, GA (US); Alla Semenovna Zelikovskaya, Roswell, GA (US)

(73) Assignee: Southern Company Services, Inc., Atlanta, GA (US)

( * ) Notice: Subject to any disclaimer, the term of this patent is extended or adjusted under 35 U.S.C. 154(b) by 171 days.

(21) Appl. No.: 12/555,483

(22) Filed: Sep. 8, 2009

(51) Int. Cl.
*H04L 12/56* (2006.01)
(52) U.S. Cl. .......................... 370/230; 709/232; 718/105
(58) Field of Classification Search .......... 370/229–235, 370/351, 389, 395.5–395.52, 400–401, 428; 709/203, 223–224, 229
See application file for complete search history.

(56) References Cited

U.S. PATENT DOCUMENTS

| 6,167,446 | A | 12/2000 | Lister et al. |
|---|---|---|---|
| 6,374,295 | B2 | 4/2002 | Farrow et al. |
| 6,519,714 | B1 | 2/2003 | Sweet et al. |
| 6,973,491 | B1 | 12/2005 | Stsveley et al. |
| 6,985,944 | B2 | 1/2006 | Aggarwal |
| 7,072,800 | B1 | 7/2006 | Fernandez et al. |
| 7,139,811 | B2 | 11/2006 | Lev Ran et al. |
| 7,162,509 | B2 | 1/2007 | Brown et al. |
| 7,194,543 | B2 | 3/2007 | Robertson et al. |
| 7,203,732 | B2 | 4/2007 | McCabe et al. |
| 7,395,349 | B1 | 7/2008 | Szabo et al. |
| 7,454,500 | B1 * | 11/2008 | Hsu et al. ...................... 709/226 |
| 7,822,839 | B1 * | 10/2010 | Pruitt et al. ................... 709/223 |
| 2001/0049741 | A1 * | 12/2001 | Skene et al. .................. 709/232 |
| 2003/0126263 | A1 * | 7/2003 | Fenton et al. ................. 709/226 |
| 2005/0102414 | A1 | 5/2005 | Hares et al. |
| 2006/0112175 | A1 | 5/2006 | Sellers et al. |
| 2006/0259625 | A1 | 11/2006 | Landfeldt et al. |
| 2006/0265489 | A1 | 11/2006 | Moore |
| 2007/0174426 | A1 | 7/2007 | Swildens et al. |
| 2007/0289017 | A1 | 12/2007 | Copeland |

OTHER PUBLICATIONS

Bourke, Server Load Balancing, O'Reilly & Associates, Inc., 182 pages, 2001.*

* cited by examiner

*Primary Examiner* — Frank Duong
(74) *Attorney, Agent, or Firm* — Womble Carlyle Sandridge & Rice, PLLC

(57) ABSTRACT

A method, system, and computer program product for dynamically routing query request messages to a database server resident on a computing system. A configurable port proxy service is created on the database server that listens on a particular port for query request messages. An administrator port is implemented on the database server that communicates with the port proxy service. The configurable port proxy service is pinged by a traffic manager application operating on the computing system to determine if a database server instance is available to send database traffic. Query requests are routed to the database server instance if the database server instance is available to accept query request messages. Each administrator command from a port console application is serialized to a configuration file as it issues that will return the port proxy service to a previous state if the database server fails.

28 Claims, 4 Drawing Sheets

LOAD BALANCING PORT PROXY FOR DYNAMICALLY CONTROLLING ROUTING OF QUERY REQUESTS

TECHNICAL FIELD

The invention relates generally to disaster recovery for a corporate information technology infrastructure and, more particularly to methods for controlling database query requests for a corporate computer network during a disaster recovery.

BACKGROUND OF THE INVENTION

In disaster recovery situations, corporate computer network administrators need the ability to control which database responds to SQL Requests. Certain products that are commercially available, such as 3DNS produced by F5 Networks, respond to requests made to a given database by routing requests to a database dynamically depending on scripted rules. There is no way to dynamically take control of this routing to remove a database from a mix or toggle between a defined primary and secondary server. In a corporate infrastructure that uses shared instances for multiple applications, the server could be available, while the instance for a particular application might not be available.

The Domain Name System (DNS) is a distributed database that maps host names to Internet Protocol (IP) addresses. The Domain Name System (DNS) helps users to locate resources on the Internet. Every computer on the Internet has a unique IP address. A DNS server is used to resolve host names associated with IP addresses. The DNS server that receives a domain name converts a string representing the domain name into a network address.

Translating the host name into the IP address is called "resolving the domain name." The goal of DNS is for any Internet user to reach a specific website IP address by entering its domain name. Domain names are also used for reaching e-mail addresses and for other Internet applications. DNS automatically converts the names entered into a web browser address bar to the IP addresses of web servers hosting those sites.

DNS implements a distributed database to store this name and address information for all public hosts on the Internet. DNS assumes IP addresses do not change, i.e., that IP addresses are statically assigned rather than dynamically.

The DNS database resides on a hierarchy of special database servers. When web browser clients issue requests involving Internet host names, a software component called the DNS resolver first contacts a DNS server to determine the server's IP address. The DNS resolver is usually built into the network operating system. If the DNS server does not contain the needed mapping, it will forward the request to a different DNS server at the next higher level in the hierarchy. After potentially several forwarding and delegation messages are sent within the DNS hierarchy, the IP address for the given host eventually arrives at the resolver, that in turn completes the request over Internet Protocol.

Round Robin DNS is the easiest method available to load balance web servers. Round robin works by assigning multiple IP addresses to the fully qualified domain name (FQDN) of a resource. The IP addresses are rotated so that one server IP address is handed out first, then the next request is given the next IP address in the list. This repeats as each DNS resolution is handled, moving down the list of IP addresses until the end of the list is reached, which starts the whole process over. If a service at one of the IP addresses in the list fails, Round Robin DNS will continue to hand out that address and clients will still attempt to reach the inoperable service. Round Robin DNS is not the best choice for load balancing since it simply alternates the order of the IP address records each time a name server is queried. Round Robin DNS does not consider matching the user IP address and its geographical location, transaction time, server load, or network congestion. Round Robin DNS load balancing works best for services with a large number of uniformly distributed connections to servers of equivalent capacity.

SUMMARY

Embodiments of the invention are directed to a Windows service that will communicate with a traffic manger, such as 3DNS, to determine whether a database instance should accept traffic from the 3DNS traffic manager. The embodiments are most effective for disaster recovery where specific database instance routing needs to be controlled. Although the embodiments disclosed are for databases, the concepts are useful for other applications working with 3DNS to control traffic.

In one embodiment, a method, system, and computer program product are provided for dynamically routing query request messages to a database server resident on a computing system. A configurable port proxy service is created on the database server that listens on a particular port for query request messages. An administrator port is implemented on the database server that communicates with the port proxy service. The configurable port proxy service is pinged by a traffic manager application operating on the computing system to determine if a database server instance is available to send database traffic. Query requests are routed to the database server instance if the database server instance is available to accept query request messages. Each administrator command from a port console application is serialized to a configuration file as it issues that will return the port proxy service to a previous state if the database server fails.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION

The following description is provided as an enabling teaching of the invention and its best, currently known embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

Figure 1:
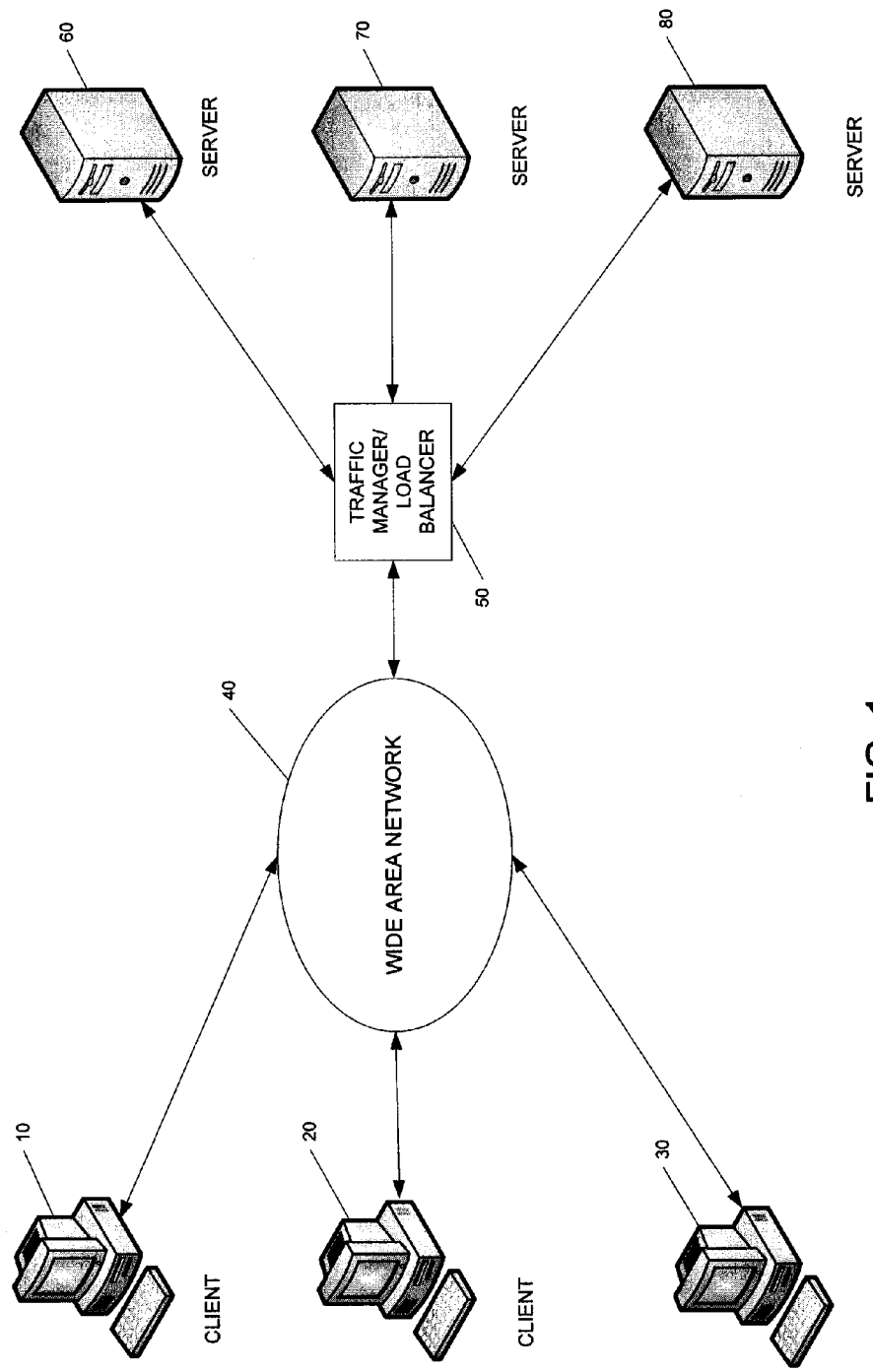
FIG. 1 illustrates a corporate wide area network environment in which embodiments of the invention can be implemented.

FIG. 1 illustrates a corporate wide area network environment in which embodiments of the invention can be implemented. Client devices, such as clients 10, 20, communicate with server devices, such as servers 60, 70, 80 over a wide area network 40, such as the Internet or corporate intranet. Servers 60, 70, 80 can include, but are not limited to, application severs, web servers, mail servers, file transfer protocol (FTP) servers, and database servers. In a large corporate network having thousands of client devices communicating with numerous servers, a traffic manager/load balancer application 50 may direct message traffic from the large number of clients to different servers based on various factors such as load demand and geography.

As used herein, the term database instance is used to describe a complete database environment, including the relational database management system, table structure, stored procedures, and other functionality. The most common use of the term is to describe multiple instances of the same database. For example, a particular database could have a development instance, a pre-production instance, and a production instance (containing real data). In the disclosed embodiments, a single shared database server can host multiple application data stores.

Microsoft SQL Server (2000 and subsequent) supports multiple instances of the SQL Server database engine running concurrently on the same computer. Each instance of the SQL Server database engine has its own set of system and user databases that are not shared between instances. An application can connect to each SQL server database engine instance in similar fashion to how it connects to SQL Server database engines running on different computers. An instance of SQL Server refers to both the memory and the files used by a particular installation.

Microsoft SQL Server comes with a command line application that exposes management features of SQL Server. It enables SQL queries to be written and executed from the command prompt. The command line application can also act as a scripting language to create and run a series of SQL statements as a script. Such scripts can be used for database management.

In computer networking, a port is an application-specific or process-specific software construct serving as a communications endpoint used by transport layer protocols of the Internet Protocol (IP) Suite. Any server machine makes its services available using numbered ports, one for each service that is available on the server. For example, if a server machine is running a web server and a file transfer protocol (FTP) server, the web server would typically be available on port 80, and the FTP server would be available on port 21. Network clients use different ports to transfer data. Generally, one port is used to send data and another to receive data, so packets of data do not collide. Clients connect to a service at a specific IP address and on a specific port number.

Once a client has connected to a service on a particular port, it accesses the service using a specific protocol. Ports range from 1 to 65535 for Transmission Control Protocol (TCP) and User Datagram Protocol (UDP). Every web server on the Internet conforms to the Hypertext Transfer Protocol (HTTP).

Traffic management devices are any devices that manage network traffic. These devices can include routers, proxies, firewalls, load balancers, network address translation devices, etc. A traffic manager may control the flow of data packets delivered to and forwarded from an array of application servers, such as web servers. The traffic manager may direct a request for a resource to a particular web server based on network traffic, network topology, capacity of the server, or content requested. The traffic manager may receive data packets from, and transmit data packets to, the Internet, an intranet, or a local area network accessible through another network. The traffic manager may recognize packets that are part of the same communication, flow, and/or stream and may perform special processing on such packets, such as directing them to the same server so that state information is maintained. The traffic manager may support a wide variety of network applications such as web browsing, email, telephony, streaming multimedia, and other traffic that is sent in packets.

Load balancing products, such as Global Traffic Manager (i.e., 3DNS) from F5 Networks, employ several different types of load-balancing methods to analyze metric information and optimally balance client requests (load demand) between redundant geographically distributed virtual servers. These load-balancing methods can include round trip time, round robin, least connections, packet completion rate, quality of service, server array controller packet rate, topology, global availability, hops, time of day, and operating conditions.

As part of a disaster recovery implementation for SQL Server databases that include a 3DNS traffic manager, embodiments of the invention provide database administrators with the capability to toggle between the primary and secondary database servers. The disclosed embodiments remove the lengthy rules adjustment for a 3DNS traffic manager, which could take hours to implement. In an exemplary embodiment, the destination server will switch instantaneously to the server appearing as enabled. The exemplary embodiment can work for database servers and also other server types.

The 3DNS traffic manager takes a DNS name and routes requests to a particular server. In an exemplary embodiment, in order to inject control of request routing, a single service is provided that both the 3DNS traffic manager and database administrators can communicate with over standard TCP/IP using one or more "ports" for each audience. The 3DNS traffic manager pings the Windows service to determine whether or not it is available to accept traffic. This "ping" port is defined as a separate "port" for each application/database instance. The Windows service will respond with an acknowledgment (ACK) message if the application/database instance is available, or with a negative acknowledgement (NAK) message if the application/database instance is not available.

An administrator "port" is implemented that can list all current ports and their applications, enable traffic, disable traffic, delete an application port, or add an application port. As administrator commands are issued, any changes are serialized to an Extensible Markup Language (XML) configuration file that will properly return to its previous state, if the server goes down. The disclosed embodiments also includes a console program that can communicate with the Windows service locally, or by passing a server name to communicate remotely.

Architecture

Figure 2A:
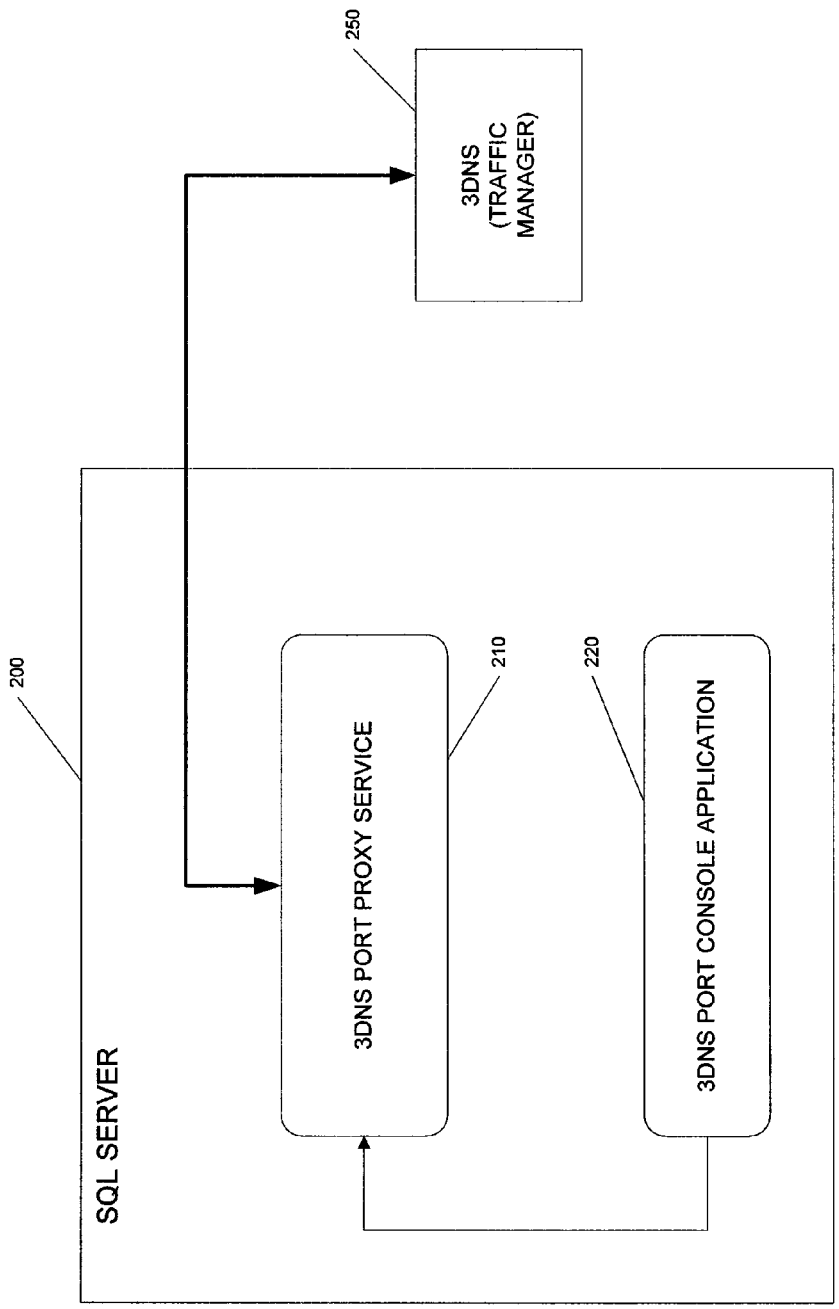
FIGS. 2A-2B illustrate the architecture of the 3DNS traffic manager Port Proxy in exemplary embodiments.
Figure 2B:
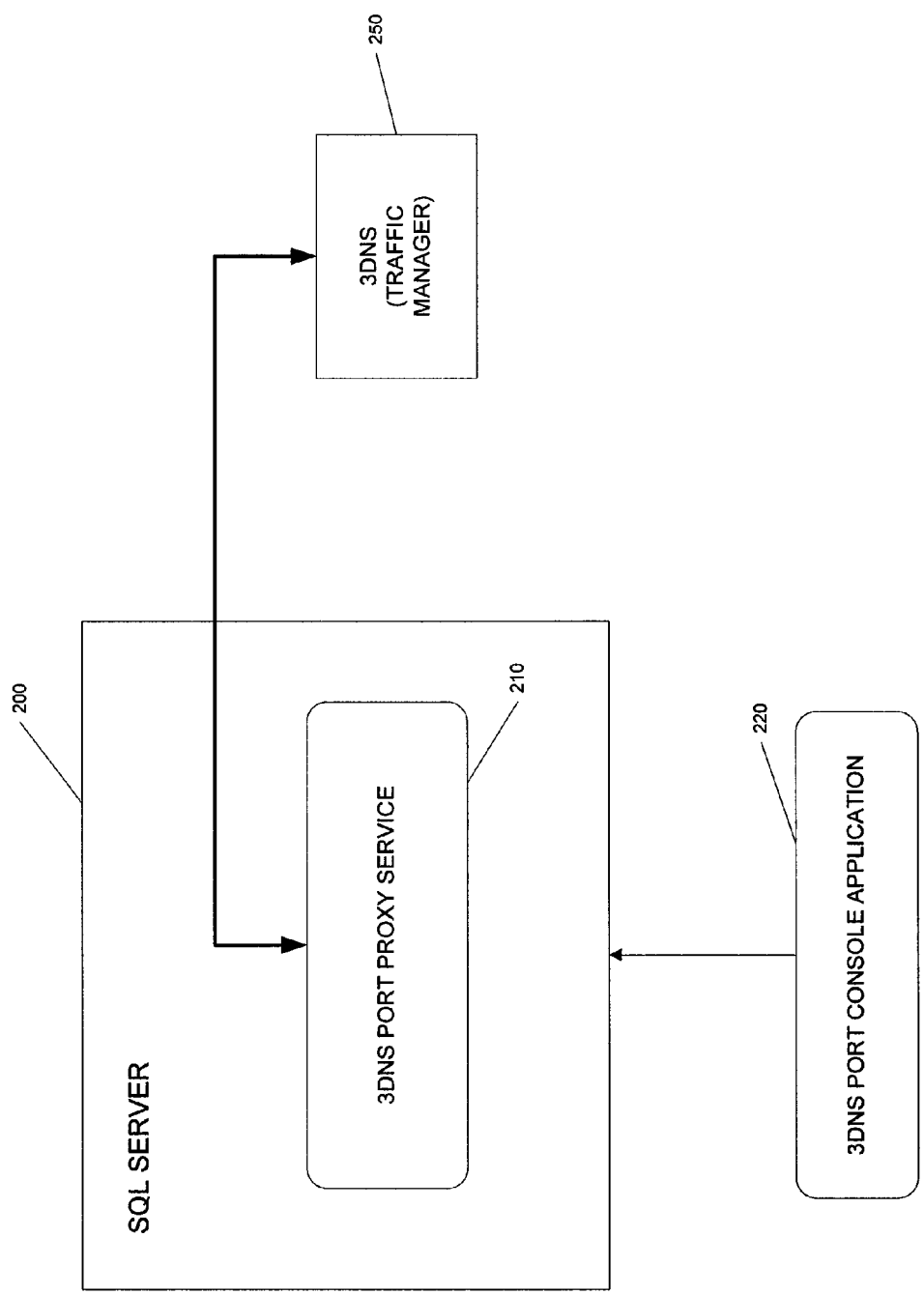

FIGS. 2A-2B illustrate the architecture of the 3DNS Port Proxy in exemplary embodiments. The architecture includes a Windows service 210 running on a database server 200. The architecture further includes a console application 220. The Windows service 210 listens on a configurable port for 3DNS messages. The 3DNS traffic manager 250 will ping the Windows service 210 to determine if the database server 200 is available to send the database traffic.

The system architecture addresses two key requirements: (1) the list of ports to listen on should be configurable, and (2) a Data Base Administrator should be able to direct the Windows service 210 either to start or to stop listening on a particular port with a simple command. The architecture includes a Windows service 210 that is multithreaded (i.e., one thread per port), configurable (XML file contains a list of ports), and implements Windows Sockets (designated port) as an interprocess communications mechanism for communicating with the console application 220. The console application 220 utilizes Windows Sockets to make the Windows service 210 either stop or start listening on a particular port. Although FIG. 2A depicts the console application 220 operating on database server 200, in another embodiment, such as shown in FIG. 2B, the console application 220 can run on the local desktop of a database administrator. More generally, the console application can reside anywhere within the private corporate network from which it has direct access to the 3DNS traffic manager service. The architecture shown in FIG. 2B provides the capability to administer the port proxy service remotely.

3DNS Port Proxy Service

The 3DNS Port Proxy service 210 uses configuration (config) files that contains the following fields: (1) command port number, (2) sender port number, and (3) XML file location. The command port number is the port on which the Port Proxy service 210 listens for commands. The sender port number is the port that is used to send the information back to the console application 220. The XML file location contains the port list file.

In the following example, the list of ports on which the service is listening is located in a file named PortList.xml. The exact file name is defined in a 3DNS Port Proxy configuration file. A sample port proxy configuration file is as follows:

```
<?xml version="1.0" encoding="utf-8" ?>
<PortList>
  <Port>
    <Name>Test</Name>
    <Number>9324</Number>
    <Enabled>True</Enabled>
  </Port>
  <Port>
    <Name>ARMS</Name>
    <Number>9274</Number>
    <Enabled>False</Enabled>
  </Port>
</PortList>
```

This file will be read at the Port Proxy service 210 startup time. For each port in the list, a new thread will be created. Each thread will set up a listener on the port. An incoming connection will be acknowledged by the service. No data exchange is required.

The Port Proxy service 210 will be able to accept and process the commands issued by the console application 220 described below. In an exemplary embodiment, the command port accepts commands in the following formats:

LIS|server_name|a
ENA|servername|port_number|port_name
DIS|server_name|port_number|port_name
DEL|server_name|port_number|port_name
ADD|server_name|port_number|port_name|true/false
Console Application: 3DNSPortConsole
Usage: 3DNSPortConsole <command>
Commands:
List [/s=<server_name>] </a=true|false>
Enable [/s=<server_name>] [/p=<port_number>]|[/n=<port_name>]
Disable [/s=<server_name>] [/p=<port_number>]|[/n=<port_name>]
Add [/s=<server_name>] /p=<port_number>/n=<port_name> /e={true|false}
Delete [/s=<server_name>] [/p=<port_number>]|[/n=<port_name>]

All commands have the server name as the first parameter. If the server name is not provided, the command will be executed on the local server. Only servers 200 that have 3DNS Port Proxy service 210 can be used as the parameter.

List Command

The list command allows viewing the port list. If the second parameter is set to true, only active ports will be displayed. An administrator can issue the list command remotely from the console application (Example 3).

Examples 1. 3DNSPortConsole.exe list /a=false

The list of all ports from PortList.xml will be displayed by this command.

2. 3DNSPortConsole.exe list /a=true

Only ports from PortList.xml that the service is listening on will be displayed by this command.

3. 3DNSPortConsole.exe list /s=gaxgpsq07ua /a=false

The list of all ports from PortList.xml on server gaxgpsq07ua will be displayed by this command.

Enable Command

The enable command allows activating a disabled port from the list. It can be done either by using port number or port name. An administrator can issue the enable command remotely from the console application (Example 3).

Examples 1. 3DNSPortConsole.exe enable /p=9234

This command starts a listener on port 9234. The port has to be in PortList.xml.

2. 3DNSPortConsole.exe enable /n=Test

This command starts a listener on port 9234 too because it is called Test in PortList.xml.

3. 3DNSPortConsole.exe enable /s=gaxgpsq07ua /p=2222

This command starts listening on port 2222 on remote server gaxgpsq07ua.

Disable Command

The disable command allows disabling a listener on a port from the list. It can be done either by using port number or port name. An administrator can issue the disable command remotely from the console application (Example 3).

Examples 1. 3DNSPortConsole.exe disable /p=9234

This command shuts down a listener on port 9234.

2. 3DNSPortConsole.exe disable /n=Test

This command shuts down a listener on port 9234 too because it is called Test in PortList.xml.

3. 3DNSPortConsole.exe disable /s=gaxgpsq07ua /p=2222

This command stops listening on port 2222 on remote server gaxgpsq07ua.

Add Command

The add command adds a new port to the list. It requires all three parameters: port number, port name, and status (true or false). If the third parameter is true a listener on that port is started. An administrator can issue the add command remotely from the console application (Example 3).

Examples 1. 3DNSPortConsole.exe add /p=2222/n=3DNS /e=true
   The port is added to PortList.xml and a listener on port 2222 is started by this command.
2. 3DNSPortConsole.exe add /p=2222/n=3DNS /e=true
   This command adds port 2222 to PortList.xml.
3. 3DNSPortConsole.exe add /s=gaxgpsq07ua /p=2222/n=3DNS /e=true
   This command modifies PortList.xml on the server gaxgpsq07ua and starts a new listener there.

Delete Command

The delete command is similar to the disable command. However, the port is deleted from PortList.xml permanently. The deleted port can be activated only by using the add command. An administrator can issue the delete command remotely from the console application (Example 3).

Examples 1. 3DNSPortConsole.exe delete /p=9234
   This command shuts down a listener on port 9234.
2. 3DNSPortConsole.exe delete /n=Test
   This command shuts down a listener on port 9234 because it is called Test in PortList.xml.
3. 3DNSPortConsole.exe delete /s=gaxgpsq07ua /p=2222
   This command stops listening on port 2222 on remote server gaxgpsq07ua.

Figure 3:
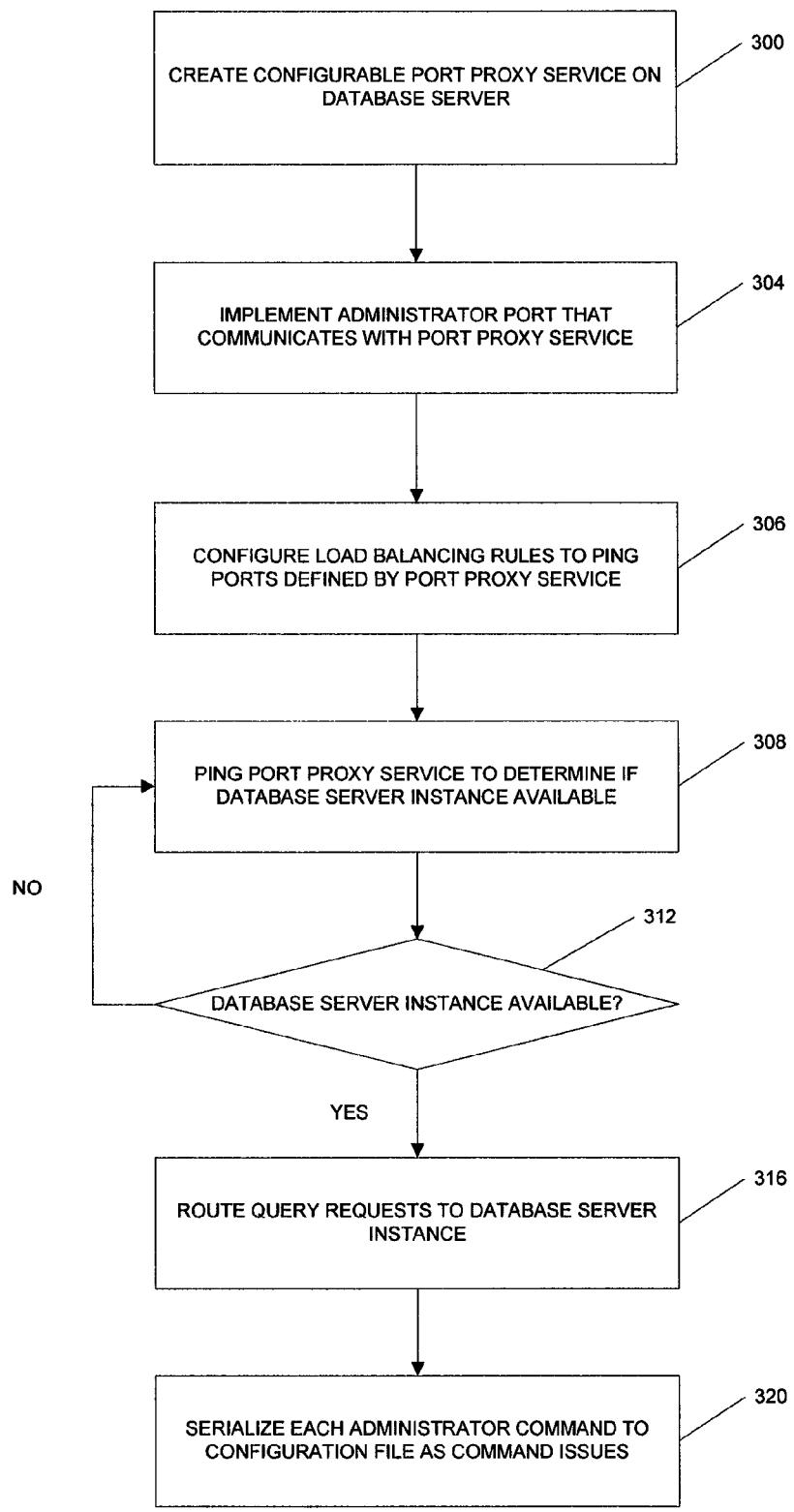
FIG. 3 illustrates the processing logic for dynamically routing query requests to a database server in an exemplary embodiment.

FIG. 3 illustrates the processing logic for dynamically routing query requests to a database server in an exemplary embodiment. A configurable, multithreaded port proxy service is created on a database server such that the port proxy service listens on a particular port for query request messages, as indicated in logic block 300. An administrator port is implemented on the database server as indicted in logic block 304. The port console application on the database server communicates with the port proxy service via the administrator port using an interprocess communications mechanism such as Windows socket to direct the port proxy service to either start or stop listening on the particular port. The traffic manager/load balancer application is configured by the console application to ping ports defined by the port proxy service, as indicated in logic block 306. A traffic manager application, such as 3DNS, then pings the port proxy service to determine if a database server instance is available to accept query requests, as indicated in logic block 308. In decision block 312, a determination is made as to whether or not the database server instance is available and if it is, query requests are routed to the database server instance, as indicated in logic block 316. Each administrator command from the port console is serialized to a configuration file as it issues that will return the port proxy service to a previous state if the database server fails. This step is indicated in logic block 320. In other embodiments, the inventive concepts disclosed can be applied to other applications working with a traffic manager, such as 3DNS, to control traffic other than database server query messages.

Although the embodiments have been described in an environment that includes a 3DNS traffic manager/load balancer application, the claimed invention is not limited to any specific load balancer.

Embodiments of the invention have been described as computer-implemented processes. It is important to note, however, that those skilled in the art will appreciate that the mechanisms of the embodiments described are capable of being distributed as a program product in a variety of forms, and that the invention applies regardless of the particular type of computer readable storage media utilized to carry out the distribution. Examples of computer readable storage media include, without limitation, recordable-type media such as CompactFlash cards, portable hard drives, diskettes, CD ROMs, memory sticks, and flash drives.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments described without the corresponding use of other features. Accordingly, the foregoing description of the exemplary embodiments is provided for the purpose of illustrating the principles of the invention, and not in limitation thereof, since the scope of the invention is defined solely by the appended claims.

What is claimed:

1. A method for dynamically routing query request messages to a database server resident on a computing system, comprising the steps of:
   creating a configurable port proxy service on the database server that listens on a particular port for query request messages;
   implementing an administrator port on the database server that communicates with the port proxy service;
   pinging the configurable port proxy service by a traffic manager application operating on the computing system to determine if a database server instance is available to send database traffic;
   routing query requests to the database server instance if the database server instance is available to accept query request messages; and
   serializing each administrator command from a port console application to a configuration file as it issues that will return the port proxy service to a previous state if the database server fails.

2. The method for dynamically routing query request messages of claim 1 wherein the port proxy service maintains a port list file including a plurality of enabled ports and an application corresponding to each enabled port.

3. The method for dynamically routing query request messages of claim 1 wherein the port console application enables or disables query request messages via the administrator port.

4. The method for dynamically routing query request messages of claim 1 wherein the port console application adds or deletes an application port via the administrator port.

5. The method for dynamically routing query request messages of claim 1 further comprising defining a ping port as a separate port for each database instance.

6. The method for dynamically routing query request messages of claim 1 wherein the port proxy service utilizes a configuration file including a command port number field, a sender port number field, and an Extensible Markup Language (XML) file location field.

7. The method for dynamically routing query request messages of claim 6 wherein the port proxy service listens on the port identified by the command port number.

8. The method for dynamically routing query request messages of claim 6 wherein the port proxy service sends information to the port console application on the port identified by the sender port number.

9. The method for dynamically routing query request messages of claim 6 further comprising storing the port list file in the XML file location.

10. The method for dynamically routing query request messages of claim 1 wherein the port console application utilizes an interprocess communications mechanism to direct the port proxy service to either start or stop listening on the particular port.

11. The method for dynamically routing query request messages of claim 1 wherein the port proxy service is multi-threaded with one thread corresponding to each enabled port.

12. A system for dynamically routing query request messages to a database server, comprising:
   a computer processor for executing a plurality of components and communicating with at least one database server;
   a memory for storing the at least one database server and a port configuration file;
   a configurable port proxy service component on the database server that listens on a particular port for query request messages;
   an administrator port component on the database server that communicates with the port proxy service component;
   a traffic manager component for pinging the configurable port proxy service component to determine if a database server instance is available to send database traffic;
   a port console component for routing query requests to the database server instance if the database server instance is available to accept query request messages; and
   a component for serializing each administrator command from the port console component to the port configuration file as it issues that will return the port proxy service to a previous state if the database server fails.

13. The system for dynamically routing query request messages of claim 12 wherein the port console component adds or deletes an application port via the administrator port.

14. The system for dynamically routing query request messages of claim 12 wherein the port console component enables or disables query request messages via the administrator port.

15. The system for dynamically routing query request messages of claim 12 wherein the port proxy service component utilizes the port configuration file including a command port number field, a sender port number field, and an Extensible Markup Language (XML) file location field.

16. The system for dynamically routing query request messages of claim 15 wherein the port proxy service component listens on the port identified by the command port number.

17. The system for dynamically routing query request messages of claim 15 wherein the port proxy service component sends information to the port console component on the port identified by the sender port number.

18. The system for dynamically routing query request messages of claim 12 wherein the port console component utilizes an interprocess communications mechanism to direct the port proxy service component to either start or stop listening on the particular port.

19. The system for dynamically routing query request messages of claim 12 wherein the port proxy service component maintains a port list file including a plurality of enabled ports and an application corresponding to each enabled port.

20. A computer program product for dynamically routing query request messages to a database server when executed on a computing system, the computer program product comprising a computer readable storage medium having computer readable code embedded therein, the computer readable storage medium comprising:
   program instructions that create a configurable port proxy service on the database server that listens on a particular port for query request messages;
   program instructions that implement an administrator port on the database server that communicates with the port proxy service;
   program instructions that ping the configurable port proxy service to determine if a database server instance is available to send database traffic;
   program instructions that route query requests to the database server instance if the database server instance is available to accept query request messages; and
   program instructions that serialize each administrator command from a port console application to a configuration file as it issues that will return the port proxy service to a previous state if the database server fails.

21. The computer program product for dynamically routing query request messages of claim 20 wherein the port proxy service comprises program instructions that maintain a port list file including a plurality of enabled ports and an application corresponding to each enabled port.

22. The computer program product for dynamically routing query request messages of claim 20 wherein the port console application comprises program instructions that enables or disables query request messages via the administrator port.

23. The computer program product for dynamically routing query request messages of claim 20 wherein the port console application comprises program instructions that add or delete an application port via the administrator port.

24. The computer program product for dynamically routing query request messages of claim 20 wherein port proxy service comprises program instructions that utilizes a configuration file including a command port number field, a sender port number field, and an Extensible Markup Language (XML) file location field.

25. The computer program product for dynamically routing query request messages of claim 24 wherein port proxy service comprises program instructions that listen on the port identified by the command port number.

26. The computer program product for dynamically routing query request messages of claim 24 wherein port proxy service comprises program instructions that send information to the port console application on the port identified by the sender port number.

27. The computer program product for dynamically routing query request messages of claim 24 wherein port proxy service comprises program instructions that store the port list file in the XML file location.

28. The computer program product for dynamically routing query request messages of claim 24 wherein port proxy service comprises program instructions that utilizes an interprocess communications mechanism to direct the port proxy service to either start or stop listening on the particular port.

\* \* \* \* \*